United States Patent [19]
De Pauw et al.

[11] Patent Number: 5,592,600
[45] Date of Patent: Jan. 7, 1997

[54] ANIMATED DISPLAY SHOWING EXECUTION OF OBJECT-ORIENTED PROGRAMS

[75] Inventors: Wim De Pauw, Scarborough; Vincent J. Cina, Chestnut Ridge, both of N.Y.; Andrew R. Helm, Montreal, Canada; Douglas N. Kimelman, Danbury, Conn.; John M. Vlissides, Mohegan Lake, N.Y.

[73] Assignee: International Business Machines Corporation, Armonk, N.Y.

[21] Appl. No.: 312,849

[22] Filed: Sep. 27, 1994

[51] Int. Cl.$^6$ .................................................. G06T 11/00
[52] U.S. Cl. ........................... 395/140; 395/326; 395/356
[58] Field of Search ....................... 395/140, 141, 395/155, 159, 160, 161, 600, 650, 922

[56] References Cited

U.S. PATENT DOCUMENTS

| | | | |
|---|---|---|---|
| 4,821,220 | 4/1989 | Duisberg | 364/578 |
| 4,885,717 | 12/1989 | Beck et al. | 364/900 |
| 4,953,106 | 8/1990 | Gansner et al. | 364/521 |
| 4,982,344 | 1/1991 | Jordan | 364/521 |
| 5,047,959 | 9/1991 | Phillips et al. | 364/521 |
| 5,123,088 | 6/1992 | Kasahara et al. | 395/159 |
| 5,161,225 | 11/1992 | Abraham et al. | 395/600 |
| 5,187,786 | 2/1993 | Densmore et al. | 395/600 |
| 5,206,951 | 4/1993 | Khoyi et al. | 395/650 |
| 5,212,771 | 5/1993 | Gane et al. | 395/160 |
| 5,233,688 | 8/1993 | Too | 395/161 |
| 5,440,742 | 8/1995 | Schwanke | 395/650 |

FOREIGN PATENT DOCUMENTS 0261853  3/1988  Germany.

OTHER PUBLICATIONS

W. De Pauw et al, Visualizing the Behavior of Object-Oriented Systems, Object-Oriented Programming Systems, Languages, and Applications Conference, 1993, pp. 326–337.

A. Goldberg et al Smalltalk–80 The Language and Its Implementation, Addison–Wesley, Reading, MA 1983.

B. A. Barker et al, Controlling The Editing And Location of Like Objects in an Integrated Environment, IBM Technical Disclosure Bulletin, vol. 27, No. 5, Oct. 1984, p. 2955.

C. J. Cavendish et al, Address Book Class Hierarchy, IBM Technical Disclosure Bulletin, vol. 33, No. 9, Feb. 1991, pp. 1–4.

C. Cavendish et al, Object–Oriented Officevision Design, IBM Technical Disclosure Bulletin, vol. 34, No. 2, Jul. 1991, pp. 112–114.

S. F. Griffin, Object–Oriented List Supervisor to Assimilate Procedural List Components, IBM Technical Disclosure Bulletin, vol. 33, No. 8, Jan. 1991, pp. 292–293.

R. L. Baker et al, Link Class Hierarchy Design, IBM Technical Disclosure Bulletin, vol. 34, No. 9, Feb. 1992, pp. 166–167.

R. F. Austen, Graphical User Interface for the Distributed System Namespace, IBM Technical Disclosure Bulletin, vol. 35, No. 2 Jul. 1992, pp. 355–336.

(List continued on next page.)

Primary Examiner—Almis R. Jankus
Attorney, Agent, or Firm—Louis J. Percello

[57] ABSTRACT

A dynamic visual presentation animates how classes or objects send messages and relate to each other in an object-oriented program during the program's execution. The presentation depicts classes or objects as graphical nodes on a computer display. The relative proximity of these nodes varies to reflect a specific relationship between classes or objects: either communication, creation frequency, or aggregation. Communication between objects is also dynamically depicted as a set of one or more line segments each passing through two or more of the nodes that have classes of methods on a call stack. Mapping these conceptual relationships into dynamic, spatial relationships makes them explicit and observable, allowing a user to better understand, debug, and tune the object-oriented program.

21 Claims, 8 Drawing Sheets

OTHER PUBLICATIONS

R. A. Merrick et al, Treating Data Transformations as Objects, IBM Technical Disclosure Bulletin, vol. 35, No. 4A, Sep. 1992, pp. 200–205.

C. J. Georgiou et al, Encoding Data into IrrationalMagic Numbers for Fast Searching and Comparing, IBM Technical Disclosure Bulletin, vol. 36, No. 04, Apr. 1993, pp. 469–471.

D. J. Kahl et al, An Improved Trace Facility for Object–Oriented Systems, Research Disclosure, Jul. 1990, No. 315.

P. Eades, A Heuristic for Graph Drawing, Congressus Numerantium, 42, 149–169 (1984) (Not Provided).

G. Marwaha and K. Zhang, "Parellel Program Visualisation for a Message–Passing System", 1994 IEEE, pp. 200–342.

"Visual Feedback in an Object Oriented Debugger", IBM Technical Disclosure Bulletin, vol. 37, No. 04B, Apr. 1994, p. 341.

FIG. 4
400 EVENT
| TYPE 430 | OBJECT NAME 415 | TIME STAMP 420 | METHOD NAME 425 | CLASS NAME 410 |
|---|---|---|---|---|
FIG. 5
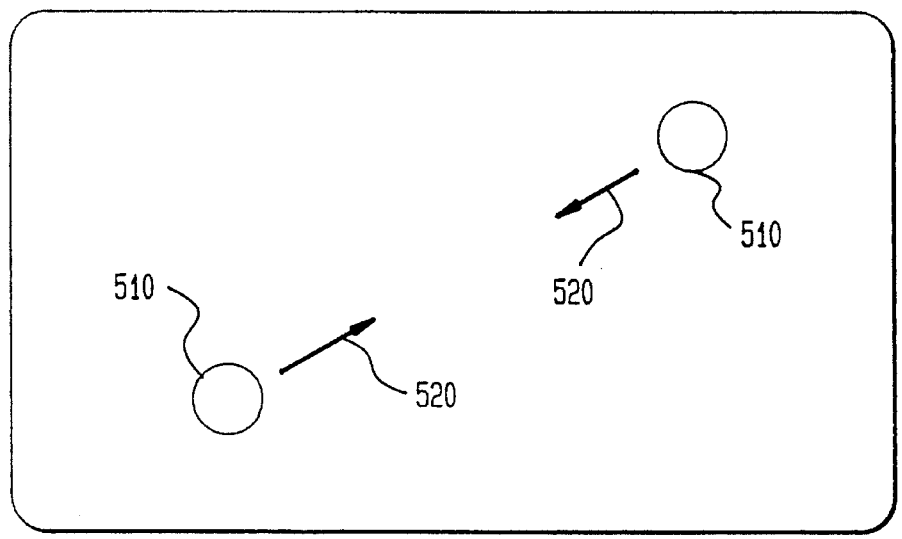
FIG. 6
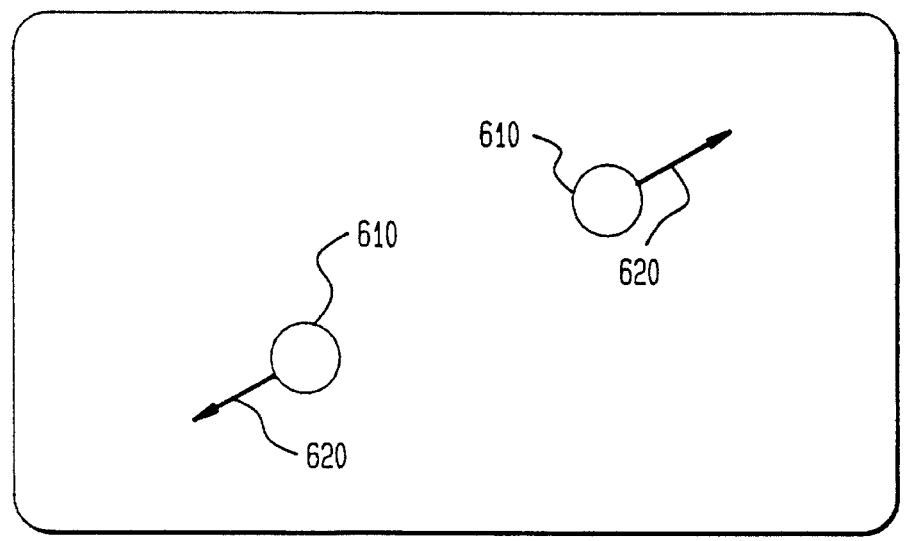

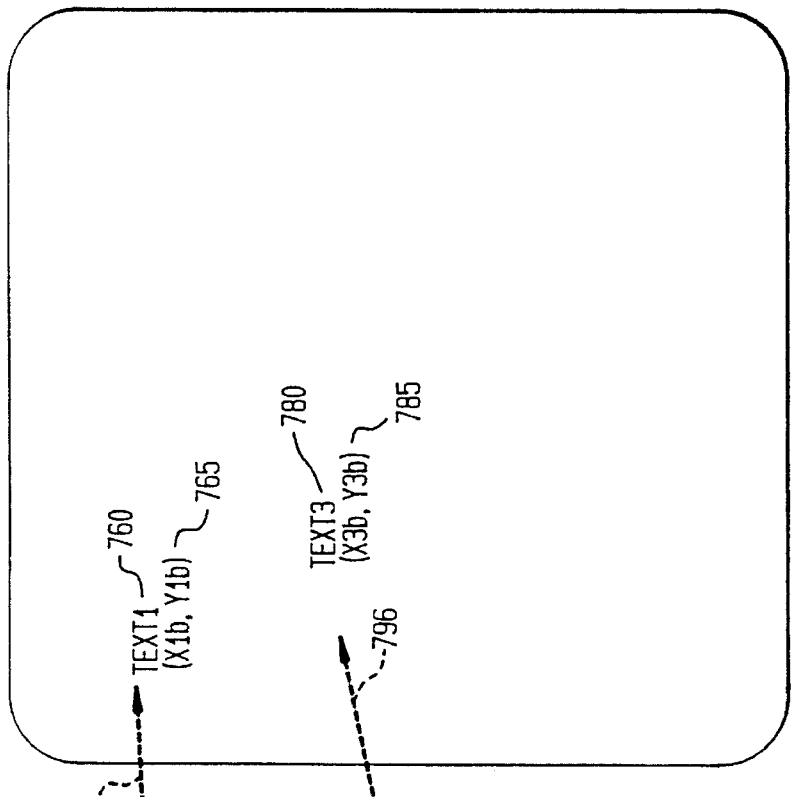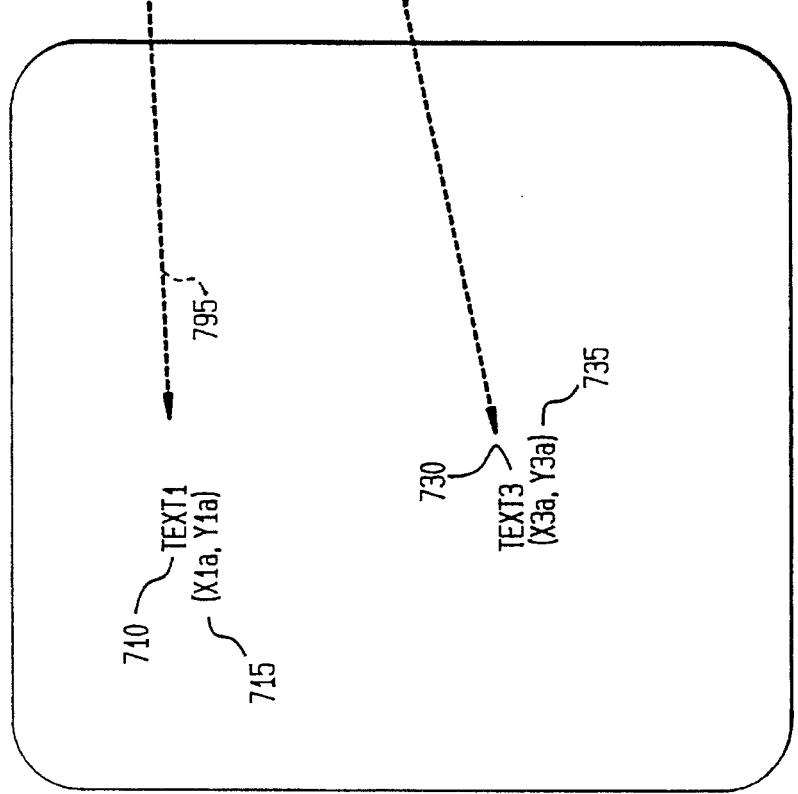

1

ANIMATED DISPLAY SHOWING EXECUTION OF OBJECT-ORIENTED PROGRAMS

FIELD OF THE INVENTION

This invention relates to the field of graphical displays. More specifically, it relates to displaying the interaction of classes and objects in object-oriented programs.

BACKGROUND OF THE INVENTION

There are three important concepts in object-oriented programming: encapsulation, inheritance, and polymorphism. Encapsulation refers to how implementation details are hidden by an abstraction called an "object." An object is said to encapsulate data and operations on that data. A object-oriented software system is made up of objects interacting with one another. They interact by sending "messages" to each other. An object implements its response to a message in a "method." Objects are unaware of each other's implementations; they only know the messages other objects respond to. Encapsulation controls complexity by partitioning the software system into small, well-defined pieces, and it makes it easy to change part of the system without affecting other parts.

Objects send messages as a result of receiving them. The "call stack" for an object-oriented program records the current chain of communication from object to object. The first object on the call stack has sent a message to the second object on the call stack; the first object is waiting for the method that implements the message to finish executing. The second object on the call stack has sent a message to the third and is waiting for completion of the corresponding method, etc. The last object on the call stack is the one for which a method is being executed currently.

Inheritance refers to taxonomic relationships between objects. An object belongs to and is defined by a "class." A class defines the set of messages an object can respond to, and it defines the data and operations that implement those responses. An object is said to be an "instance" of a class. A class can have arbitrarily many instances.

Inheritance lets classes be defined in terms of other classes. A class that inherits from another class is called a "subclass" of the other class (which is called the "parent class" or "superclass"). The subclass responds to the same messages as its parent, and it may respond to additional messages as well. The subclass "inherits" its implementation from its parent, though it may choose to reimplement some operations and/or add more data. Inheritance lets programmers define new classes easily as incremental refinements of existing ones. It also enables polymorphism.

Polymorphism refers to the substitutability of related objects. Objects are "related" if they have the same "type," and in most object-oriented languages that means they are instances of the same class, or they have a common parent class through inheritance. Objects that are related through inheritance may be treated uniformly, that is, without regard to their specific type. For example, a Graphic class that defines an abstraction for graphical objects may define a Draw operation. The Graphic class might have subclasses Rectangle and Circle that reimplement the Draw operation to draw a rectangle and circle, respectively. Polymorphism allows Rectangle and Circle instances to be treated uniformly as Graphic objects; that is, all one needs to know to tell an object to draw itself is that the object is an instance of a Graphic subclass. Whether the object is an instance of Rectangle or Circle is immaterial; one can send it the Draw message without knowing its exact type (e.g., Rectangle or Circle).

Polymorphism lets programmers-write general code that can be customized later without change. Suppose we have code that draws pictures by sending Draw messages to a set of Graphic instances. We can pass it Rectangle and Circle objects, and it will tell them to draw themselves. Later we can define a new subclass of Graphic, say, Polygon, implementing its Draw operation appropriately. Because Polygon is a subclass of Graphic, we can pass instances of Polygon to our picture-drawing code, and it will draw polygons in our picture—with no modification whatsoever.

Object-oriented programs often use thousands of objects, organized by tens or hundreds of classes. Often it's hard to understand how these programs work just by examining their code, since the code describes only the static aspects of the program (i.e., the classes). Understanding the dynamic aspects of the program requires a depiction of the program at execution time. Animated graphics are a way to depict an object-oriented program's execution.

U.S. Pat. No. 4,885,717 to Beck discloses a graphical presentation depicting individual objects on the display sending messages to each other. Objects appear as graphical nodes, and messages are shown as directed lines between the nodes. Once drawn, objects stay in fixed positions for the duration of the program's execution. No semantics are associated with placement of nodes.

STATEMENT OF PROBLEMS WITH THE PRIOR ART

There are two main problems with the prior art:

1. It does not handle realistic quantities of objects. Non-trivial object-oriented systems employ hundreds of objects or more. Displaying each object in the system produces an unintelligible mass of graphics. Moreover, objects never disappear, even when they have been deleted. Deleted objects further clutter the presentation. They distract the observer, making it harder to see the objects that are active. Displaying deleted objects may also mislead the observer into thinking that there are more objects in the system than there really are.

2. It does not handle realistic quantities of messages. Each time a message is sent, another directed line appears to depict it. Hence the number of directed lines corresponds to the number of message sends. Since this number generally exceeds the number of objects in the system, the display becomes cluttered. with directed lines even more quickly than it does with objects.

As a result of these problems, the prior art's approach is not effective for systems that are large enough to need dynamic graphical presentation.

OBJECT OF THE INVENTION

The object of this invention is an improved method for displaying the execution of object-oriented programs that aids in understanding, optimizing, and debugging object-oriented programs.

SUMMARY OF THE INVENTION

The present invention is a way to depict an object-oriented program's execution graphically in a manner that facilitates understanding, debugging, and tuning programs of realistic complexity.

Objects are usually much more plentiful than the classes from which they are instantiated. Therefore in one preferred embodiment, objects are not displayed directly; rather, their classes are depicted graphically the first time they are instantiated. A class appears as a graphical node on the display; the node identifies the class.

In a preferred embodiment, the relative position of two nodes reflects the degree of interaction between instances of their classes. In addition, the more their instances interact, the closer the two nodes will appear; the less they interact, the greater the separation. Examples of such interaction include communication (sending messages), aggregation, and creation. Other methods of showing degrees of interaction are contemplated.

In a preferred embodiment, nodes tend to drift toward and away from each other as the program executes. Classes whose objects have interacted a lot with each other tend to cluster, thereby indicating that they cooperate closely.

Furthermore, in a preferred embodiment, sets of lines between nodes on the display reflect the call stack. Whenever an object sends a message to another object, a blue (or any distinguishing color or other distinguishing characteristic) line is drawn between their respective class nodes to reflect the message send; the line for the most recent active message is colored red (or any other distinguishing color or other distinguishing characteristic). When execution of a method is completed, the line reflecting the message that it implemented is removed from the display. This set of lines forms a path whose shape changes from moment to moment as the program runs, sometimes only slightly, other times more dramatically. Alternatively, nodes may represent individual objects instead of the classes to which they belong, in which case many more nodes will be present on the display.

BRIEF DESCRIPTION OF THE DRAWINGS

FIG. 4 is a block diagram of a data structure showing the content of an event.

FIG. 5 shows two nodes with an attractive force.

FIG. 6 shows two nodes with a repulsive force.

FIG. 7 shows a display at two consecutive points in time with each display (FIG. 7a and 7b) containing nodes.

DETAILED DESCRIPTION OF THE INVENTION

Figure 1:
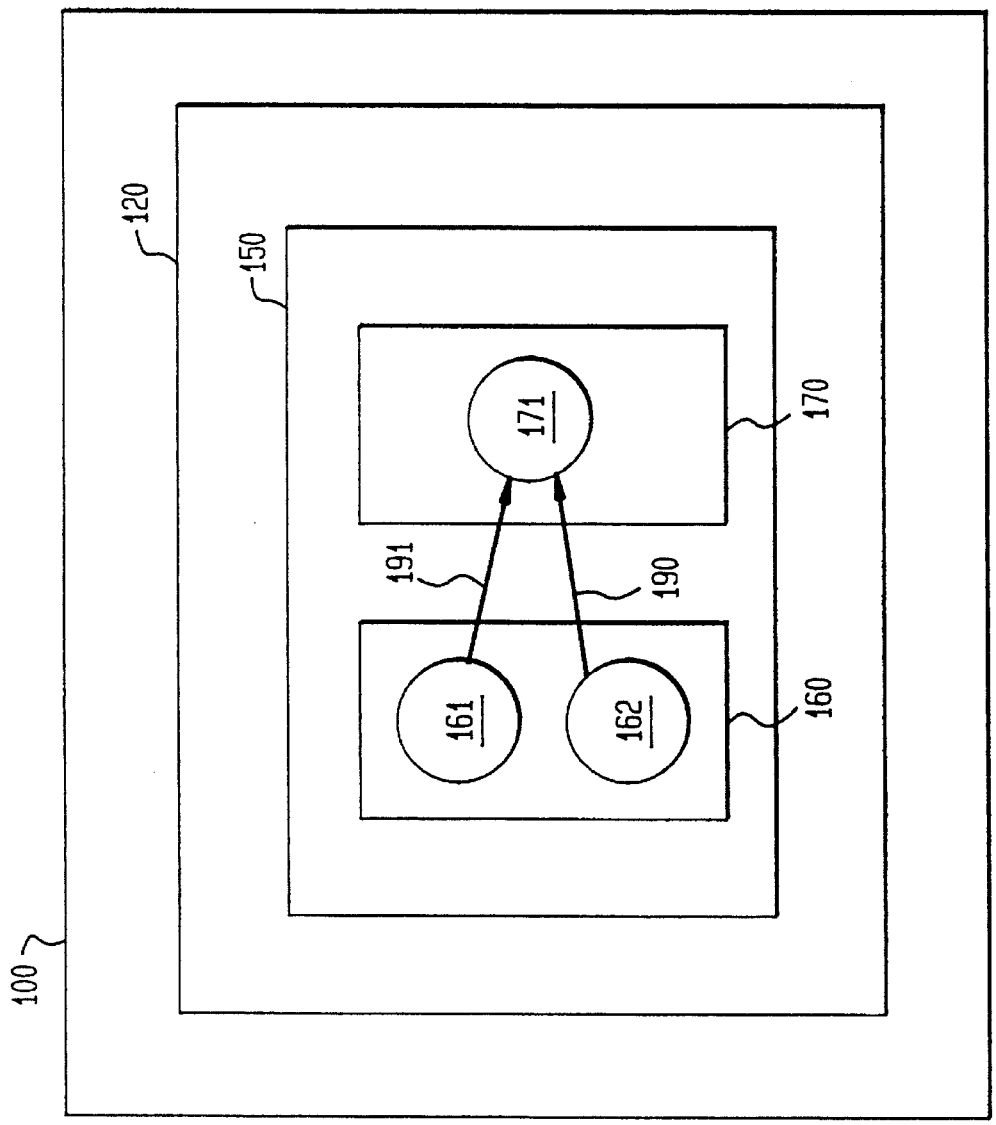
FIG. 1 is a diagram of a general computer system with an object-oriented program.

In FIG. 1, a Computer System (100) contains Main Memory (120). An Object-Oriented Program (150) is loaded into Main Memory (120).

One or more classes are contained within the Object-Oriented Program (150). Two such classes are depicted as Class1 (160) and Class2 (170).

Within each class there are objects that are created when the Object-Oriented Program (150) is executed in the Computer System (100). We depict two such objects in Class1 (160) and one object within Class2 (170). The objects shown in Class1 are Object10 (161) and Object11 (162). The object shown in Class2 (170) is Object20 (171).

Objects interact by sending messages, as shown by the arrow Message (190). Objects also create other objects, as shown by the arrow Creation (191).

Figure 2:
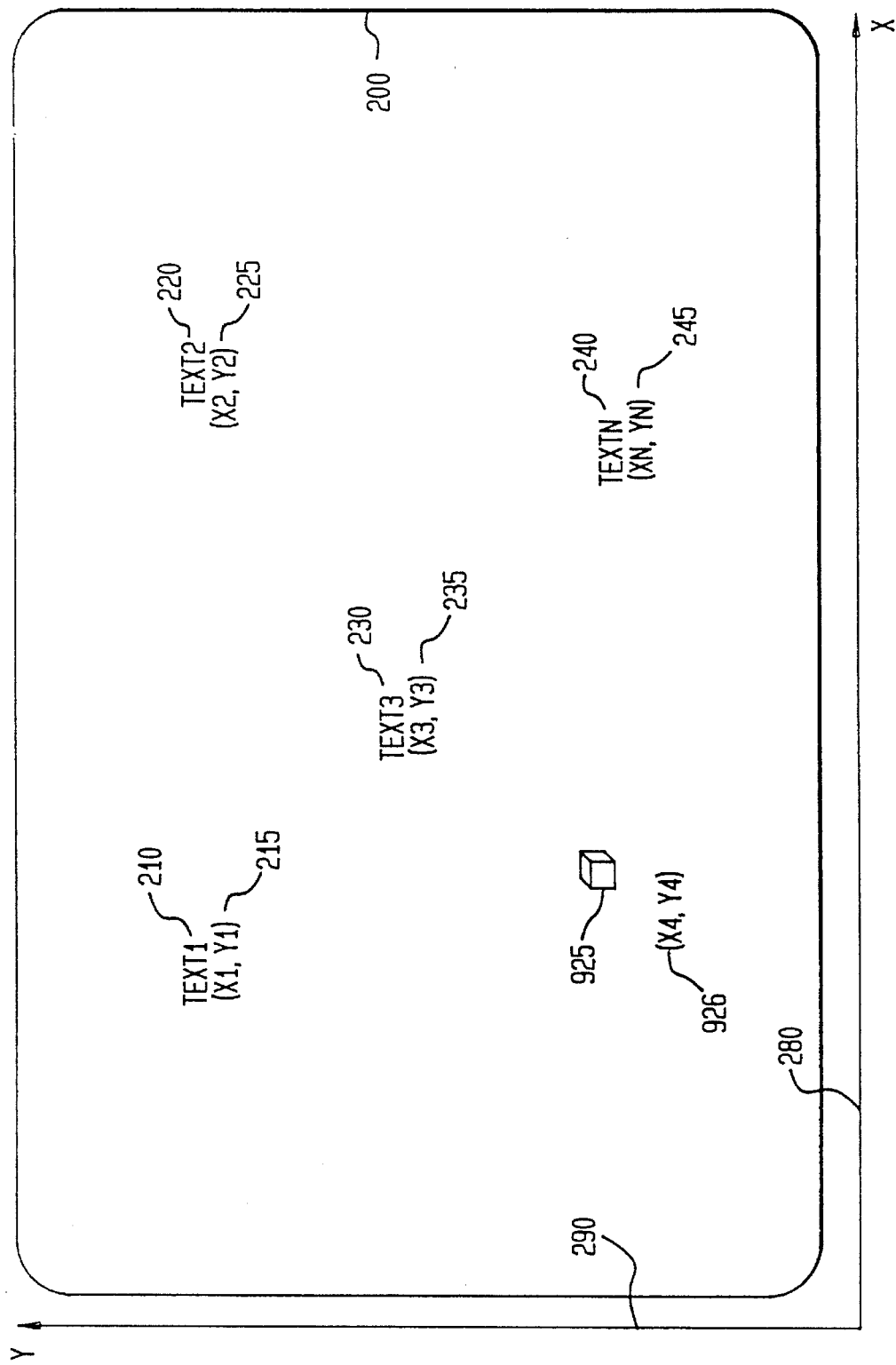
FIG. 2 is a graphical interface display that contains nodes representing classes or objects.

Refer to FIG. 2. The display is shown by the rectangle with curved corners (200). Positions on the display (200) are relative to a two-dimensional coordinate system X (280) and Y (290). The display (200) contains nodes (210, 220 230, 240, 925) that represent classes. These nodes are rendered in the form of text, shown as Text1, Text2, Text3, and Textn (210, 220, 230, 240, 925). Note that node 925 is any graphical node, e.g., an icon, text, picture, symbol, mark, etc. For nodes with text, the text identifies a class; e.g., it is the name of the corresponding class. Hereafter, without loss of generality, the graphical nodes will be described in terms of text. There can be many such nodes on the display. Typically, the display will have one node for each instantiated class. Each node (210, 220, 230, 240, 925) has a position. This position is represented in FIG. 2 by a coordinate pair in parentheses (215, 225, 235, 245, 926). Preferably, these positions (215, 225, 235, 245, 926) do not appear on the display (200) and are included in this figure to reference the position of the associated node (210, 220, 230, 240, 925).

Node 230 (Text3) represents a node on the display (200) with a position (235) at or near the center of the display (200).

Figure 3:
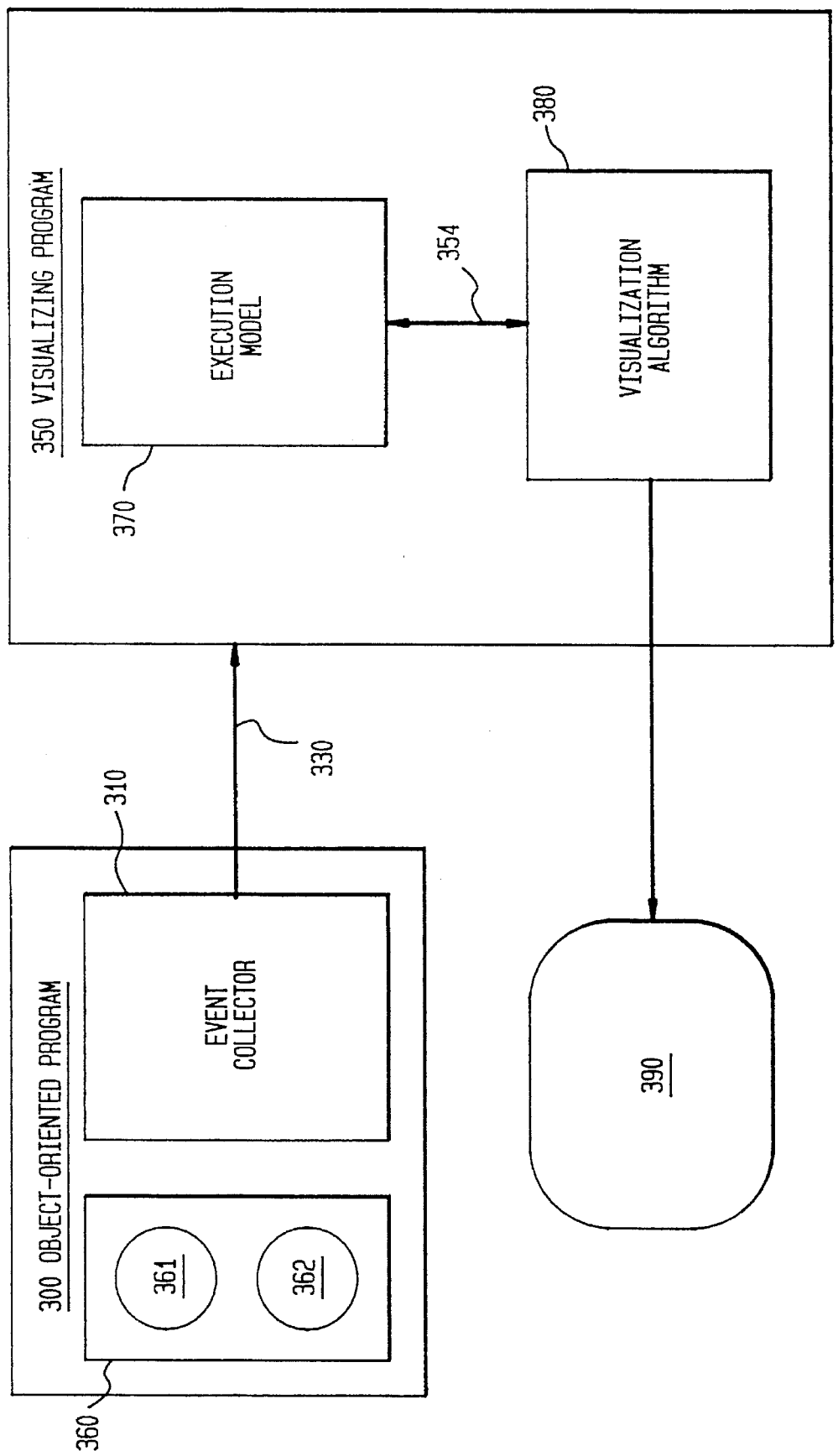
FIG. 3 shows an object-oriented program that generates events processed by a visualizing program and rendered on a graphical interface display.

FIG. 3 shows an object-oriented program that generates events processed by a novel visualizing program and rendered on a graphical interface. We are interested in understanding the run-time behavior of the Object-Oriented Program (300). Program 300 is any object-oriented program known in the art. This Object-Oriented Program (300) contains classes and objects. One such class is indicated by 360, and two such objects are indicated by 361 and 362. Operating with the Object-Oriented Program (300) at run-time is an Event Collector (310). This Event Collector (310) collects events and passes them to the Event Transmitter (330). The Event Transmitter (330) sends events to the novel Visualizing Program (350). The Visualizing Program (350) may execute concurrently with the Object-Oriented Program (300), or it may execute at a later time. The Visualizing Program (350) need not execute on the same computer system as the Object-Oriented Program (300). The Event Transmitter (330) may hold events until the Visualizing Program (300) executes. Event Transmitters (330) are known.

The Visualizing Program (350) receives events from the Event Transmitter (330) and organizes them in an Execution Model (370). The Visualization Algorithm (380) analyzes the Execution Model (370). The Visualization Algorithm (380) accesses (354) the Execution Model (370) and the graphical interface display (390).

FIG. 4 is a block diagram of a data structure showing the content of an event. An Event (400) contains a Type (430), an Object Name (415), a Time Stamp (420), a Method Name (425), and a Class Name (410). An event may contain other information. The Event (400) is sent to the Visualizing Program (350) by the Event Transmitter (330).

In the present invention, information is passed from the running Object-Oriented Program 300 (FIG. 3) to the novel Visualizing Program 350 (FIG. 3). An Event Collector 310 (FIG. 3) in the Object-Oriented Program 300 (FIG. 3) collects Events 400 (FIG. 4) and transmits them using the Event Transmitter 330 (FIG. 3) to the Visualizing Program 350 (FIG. 3). The Events 400 (FIG. 4) are small data. structures with information about the running Object-Oriented Program 300 (FIG. 3). Two Events 400 (FIG. 3) are produced every time a message 190 (FIG. 1) is processed by the Object-Oriented Program 300 (FIG. 3). The first Event 400 (FIG. 4) is produced at the start of message 190 (FIG. 1) processing and the second Event 400 (FIG. 4) is produced at the end of message 190 (FIG. 1) processing. Every Event 400 (FIG. 4) contains the following information:

Type of Event 430 (FIG. 4)

The type of event is either Enter or Leave, depending on whether the Event 400 (FIG. 4) corresponds to the start (Enter) or end (Leave) a message 190 (FIG. 1) processing.

Time Stamp 420 (FIG. 4)

Time Stamp is the time when this Event 400 (FIG. 4) was generated.

Method Name 425 (FIG. 4)

Method Name is the name of the method that is being entered or left.

Object Name 415 (FIG. 4)

Object Name is the name of the object that processed the message 190 (FIG. 1).

Class Name 410 (FIG. 4)

Class Name is the name of the class to which the object belongs.

The Events 400 (FIG. 4) are transmitted (using the Event Transmitter 330 (FIG. 3)) from the Object-Oriented Program 300 (FIG. 3) to the Visualizing Program 350 (FIG. 3). Events are organized in the Execution Model 370 (FIG. 3) of this Visualizing Program 350 (FIG. 3) in a special way to reflect different types of interaction between the classes 160, 170 (FIG. 1) of the Object-Oriented Program 300 (FIG. 3). This Execution Model 370 (FIG. 3) is changing continuously as new Events 400 (FIG. 4) are transmitted to the Event Transmitter 330 (FIG. 3) to the Visualizing Program 350 (FIG. 3) causing the degree of interaction between the classes 160, 170 (FIG. 1) to change.

The following are examples of interaction 190, 191 (FIG. 1) between classes of an Object-Oriented Program:

1. Communication

In the case of communication, the degree of interaction between any two classes 160, 170 (FIG. 1) is defined as the total number of messages 190 (FIG. 1) sent between objects of those two classes 160, 170 (FIG. 1). 2. Creation In the case of creation, the degree of interaction 191 (FIG. 1) between any two classes 160, 170 (FIG. 1) is defined as the total number of objects 171 (FIG. 1) of one class 160, 170 created by objects 161 of the other class 170, 160 (FIG. 1) of the other class.

3. Aggregation

In the case of aggregation, the degree of interaction between any two classes 160, 170 (FIG. 1) is defined as the total number of objects 171 (FIG. 1) of one class (not shown) that were created 191 (FIG. 1) during the creation of an object 161 (FIG. 1) of the other class 170 (FIG. 1).

The Visualization Algorithm 380 (FIG. 3) is a dynamic iterative algorithm that shows the classes 160, 170 (FIG. 1) of the object-oriented program 300 (FIG. 3) as floating nodes 210, 220, 230, 240, 925 (FIG. 2). These nodes 210, 220, 230, 240, 925 are displayed on a computer display 200 (FIG. 2). A node of the display is shown as text 210, 220, 230, 240 (FIG. 2) with the corresponding Class Name 410 (FIG. 4). Alternatively, a node on the display may be depicted graphically 925 (FIG. 2). The higher the degree of interaction between two classes 160, 170 (FIG. 1), the closer their respective nodes 210, 220, 230, 240, 925 (FIG. 2) will be depicted on the display 200 (FIG. 2).

The node 210, 220, 230, 240, 925 (FIG. 2) placement by the Visualization Algorithm 380 (FIG. 3) is based on a spring-based algorithm.

Figure 11:
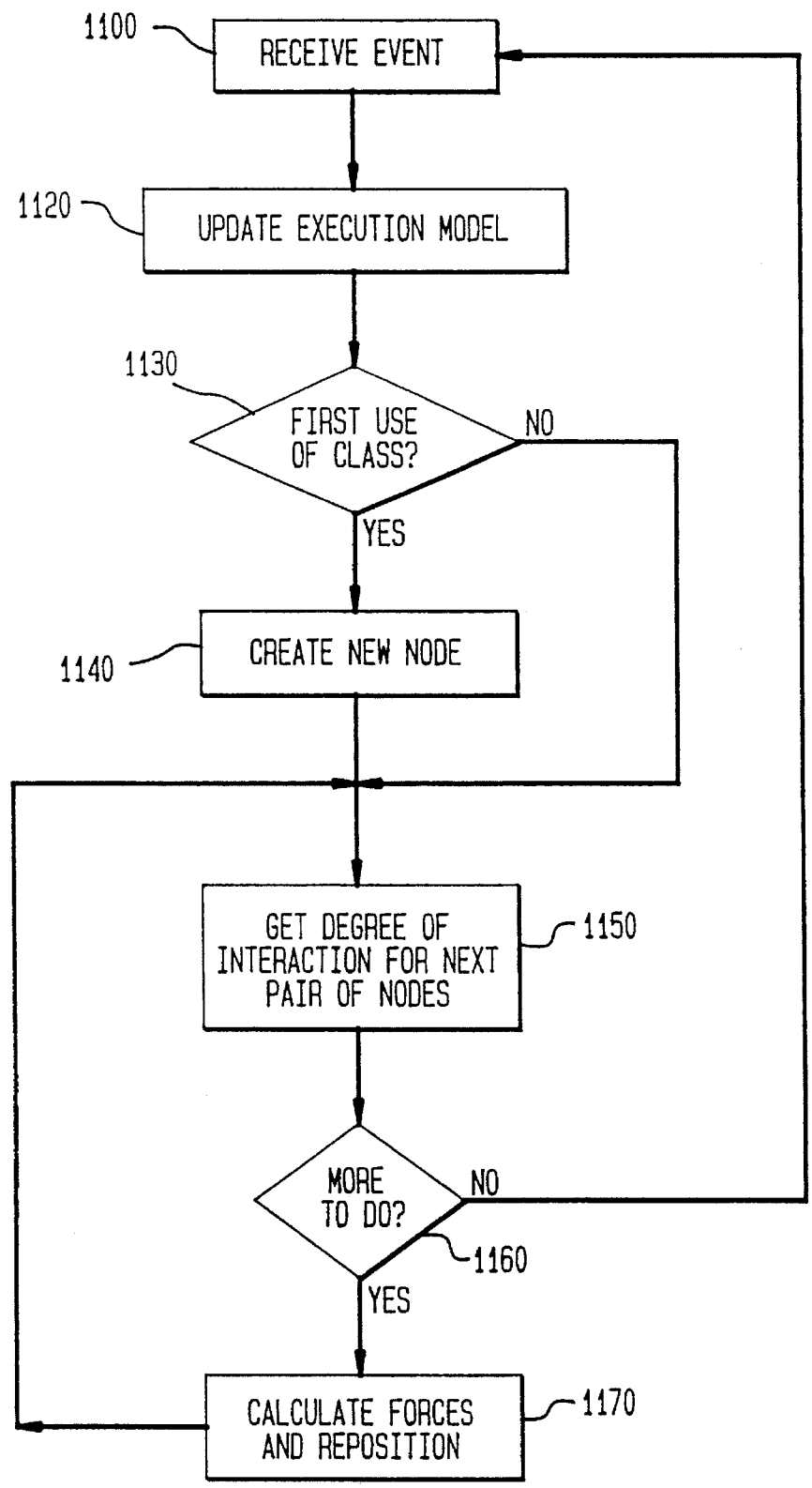
FIG. 11 is a flow chart of one preferred embodiment of the present visualization program.

The flowchart in FIG. 11 shows the Visualization Algorithm 380 (FIG. 3). At step 1110 (FIG. 11) a new Event 400 (FIG. 4) arrives in the Visualizing Program 350 (FIG. 3) from the Event Transmitter 330 (FIG. 3). The Execution Model 370 (FIG. 3), which records the interaction between any pairs of classes 160, 170 (FIG. 1), is updated at step 1120 (FIG. 11).

If a class 160 (FIG. 1) is used for the first time (which is determined by step 1130 (FIG. 11)), then a new node 230 (FIG. 2) is created at step 1140 (FIG. 11) in the center of the display (FIG. 2). Then the degree of interaction for every possible pair of classes 160, 170 (FIG. 1) (ni, nj) is processed. At step 1150 (FIG. 11), the degree of interaction for the next pair of classes is obtained 354 (FIG. 3) from the Execution Model 370 (FIG. 3) and then processed. If there are more pairs of nodes to process (which is determined at step 1160 (FIG. 11)), then node positions are calculated and nodes are repositioned at step 1170 (FIG. 11).

We calculate the position 215, 225, 235, 245, 926 (FIG. 2) of a node 210, 220, 230, 240, 925 (FIG. 2) based on a set of forces working on this node 1170 (FIG. 11).

There arc two different types of forces:

1. Attractive Forces 520 (FIG. 5)

FIG. 5 shows two nodes with an attractive force.

The two marks (510) are two nodes in a graph. The two arrows (520) represent an attractive force between the two nodes (510).

An Attractive Force 520 (FIG. 5) exists between two nodes 510 (FIG. 5) if there is a nonzero degree of interaction between these nodes 510 (FIG. 5). This force is a function of the degree of interaction and the current distance between the nodes. In a preferred embodiment, this force is proportional to this degree of interaction and to the logarithm of the current distance between these nodes 510 (FIG. 5). Hence the greater the interaction between two given nodes 510 (FIG. 5), and the further apart they are, the greater this Attractive Force 520 (FIG. 5) will be. Other functions are within the contemplation of the inventors.

2. Repulsive Forces 620 (FIG. 6)

FIG. 6 shows two nodes with a repulsive force.

The two marks (610) are two nodes in a graph. The two arrows (620) represent a repulsive force between the two nodes (610).

A Repulsive Force 620 (FIG. 6) exists between all pairs of nodes 610 (FIG. 6). This Repulsive Force 620 (FIG. 6) is a function of the degree of interaction and the current distance between the nodes. In a preferred embodiment, it is inversely proportional to the current distance between these nodes 610 (FIG. 6). (Other functions are contemplated.) If two nodes 610 (FIG. 6)

were positioned very near to each other, a high Repulsive Force 620 (FIG. 6) would exist between these two nodes 610 (FIG. 6). If two nodes 610 (FIG. 6) were positioned far from each other, almost no Repulsive Force 620 (FIG. 6) would exist between these nodes 610 (FIG. 6).

We will calculate a new position 215, 225, 235, 245, 926 (FIG. 2) for every node 210, 220, 230, 240, 925 (FIG. 2) after each new Event 400 (FIG. 4) arrives 1110 (FIG. 11) from the Event Transmitter 330 (FIG. 3). This calculation is based on these Attractive Forces 520 (FIG. 5) and Repulsive Forces 620 (FIG. 6). For every possible pair of nodes 210, 220, 230, 240 (FIG. 2), 1150 (FIG. 11 ), we will subtract the Repulsive Force 620 (FIG. 6) from the Attractive Force 520 (FIG. 5) between these two nodes. This difference is called the "resultant force."

Refer to FIG. 7. Nodes represent classes in an object-oriented program. The nodes 710 and 760 (Text1) represent the same class in both FIGS. 7a and 7b. The nodes 730 and 780 (Text3) represent the same class in both FIGS. 7a and 7b.

FIG. 7a shows Display1 (700) with two nodes (710, 730). Each node is rendered as text (Text1, Text3) that identifies the associated class. Each node has an associated position (715, 735) shown in parentheses. The position information is not shown on the display and is depicted in this figure only to indicate the position of the associated node.

FIG. 7b shows a Display2 (750) with two nodes (760, 780). Each node has an associated position (765, 785) shown in parentheses. The position information is not shown on the display and is depicted in this figure to reference the position of the associated node.

These two figures, FIG. 7a and FIG. 7b, show nodes and their positions at two consecutive points in time. Display1 (700) may occur before or after Display2 (750).

If the resultant force is positive (attraction is greater than repulsion), we will move 795, 796 each of the two nodes 710, 730 (FIG. 7) closer to the other by an amount proportional to the resultant force and the original distance between the nodes 710, 730 (FIG. 7). In this case, Time A precedes Time B, and the nodes move from their position in FIG. 7a to their position in FIG. 7b. In 750 Display2, the distance between nodes 760 Text1 and 780 Text3 (FIG. 7b) has become smaller than the distance between node 710 Text1 and node 730 Text3 (FIG. 7a).

If the resultant force is negative (repulsion is greater than attraction), we will move 795, 796 each of the two nodes 760, 780 (FIG. 7) away from each other by a distance that is proportional to the resultant force. In this case, Time B precedes Time A, and the nodes move from their position in FIG. 7b to their position in FIG. 7a. In 700 Display1, the distance between nodes 710 Text1 and 730 Text3 (FIG. 7a) has become larger than the distance between node 760 Text1 and node 780 Text3 (FIG. 7b).

This process is repeated for every new event 400 (FIG. 4) that arrives. When a class 160, 170 (FIG. 1) is instant jared for the first time, a node 230 (FIG. 2) is created in the center of the display 200 (FIG. 2). From then on, this new node 230 (FIG. 2) is repositioned 235 (FIG. 2) on the display 200 (FIG. 2) continually and is subject to the repulsive and attractive forces as explained above.

The following pseudocode describes the Visualization Algorithm 380 (FIG. 3) for every new Event 400 (FIG. 4):

1. Update Execution Model 370 (FIG. 3) which records the interaction between any pairs of classes 160, 170 (FIG. 1).

2. If the class 160 (FIG. 1) of this new Event 400 (FIG. 4) is used for the first time, create a new node 230 (FIG. 2) in the center of the display 200 (FIG. 2).

3. For every possible pair of classes 160, 170 (FIG. 1) (ni,nj)

a. Calculate Attractive Force 520 (FIG. 5) Fa(ni,nj): Fa(ni,nj)=(degree of interaction between ni, nj) * log (distance (ni,nj)) * const_a (const_a is a well-chosen constant)

b. Calculate repulsive force 620 (FIG. 6) Fr(ni,nj): Fr(ni, nj)=const_r/distance (ni,nj) (const_r is a well-chosen constant)

c. Calculate resultant force F(ni,nj): F(ni,nj)=Fa(ni,nj)–Fr(ni,nj)

d. Calculate the displacement for ni and for nj: if F(ni, nj)>0 (more attraction) move ni and nj toward each other on the display if F(ni,nj)<0 (more repulsion) move ni and nj apart from each other on the display In our approach, input data (new Events 400 (FIG. 4)) arrives at the Visualizing Program 350 (FIG. 3) continuously from Event Transmitter 330 (FIG. 3). Every time a new Event 400 (FIG. 4) arrives, one iteration is performed (as described in the pseudocode above) to calculate a new position in X 280 (FIG. 2) and Y 290 (FIG. 2) coordinates 215, 225, 235, 245, 926 (FIG. 2) for every node 210, 220, 230, 240, 925 (FIG. 2). The display 200 (FIG. 2) is updated after every iteration so that it reflects the new positions 215, 225, 235, 245, 926 (FIG. 2) of the nodes 210, 220, 230, 240, 925 (FIG. 2).

The effect of this strategy on the display is that the nodes 210, 220, 230, 240 (FIG. 2) (representing classes 160, 170 (FIG. 1)) move smoothly, in real-time, as their degrees of mutual interaction change.

As more Events 400 (FIG. 4) arrive from the Object-Oriented Program 300 (FIG. 3), the animated display 200 (FIG. 2) will gradually form clusters of nodes 760, 780 (FIG. 7) representing groups of interacting classes 160, 170 (FIG. 1).

If two nodes 210, 220 (FIG. 2) obtain the same position 215, 225 (FIG. 2) after an iteration of the Visualization Algorithm 380 (FIG. 3), we modify their positions 215, 225 (FIG. 2) so that they are separated by a very small distance, in a randomly chosen direction. In this way, both nodes can be rendered on the display.

Figure 8:
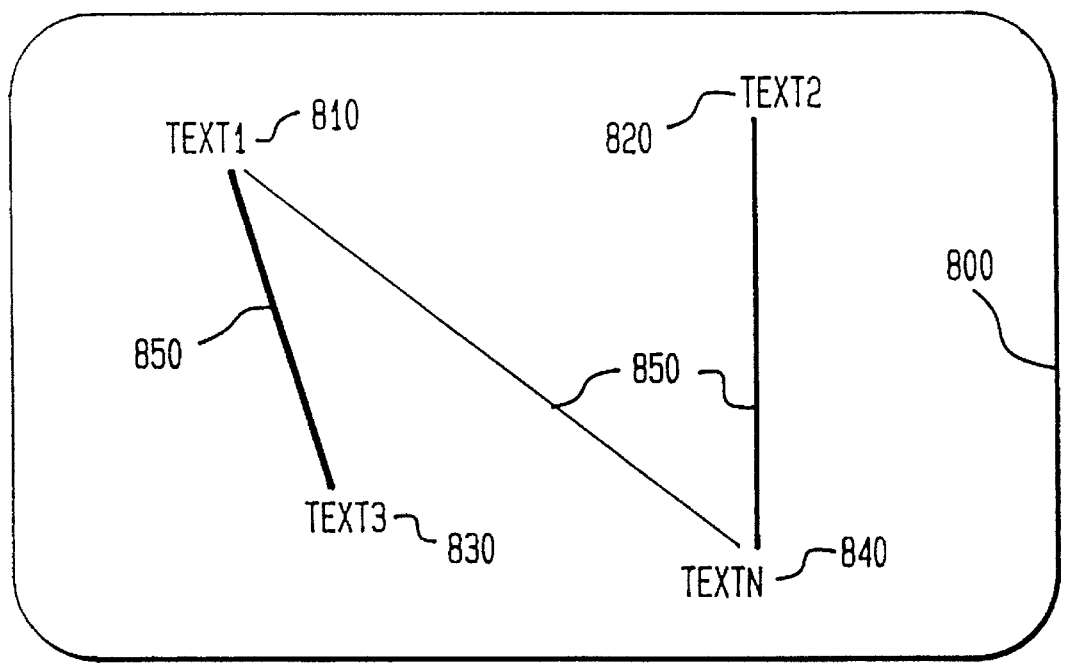
FIG. 8 shows a display with nodes and lines connecting nodes.

Refer to FIG. 8. The four nodes 810, 820, 830, 840 (FIG. 8) are rendered on a graphical display 800 (FIG. 8) with text Text1, Text2, Text3, Textn, respectively. As an option, the degrees of interaction between the nodes 810, 820, 830, 840 (FIG. 8) can be shown on the display 800 (FIG. 8) as connecting lines 850 (FIG. 8) between the respective nodes. If desired, color or thickness of these lines 850 (FIG. 8) can be used to represent the corresponding degree of interaction.

Figure 9:
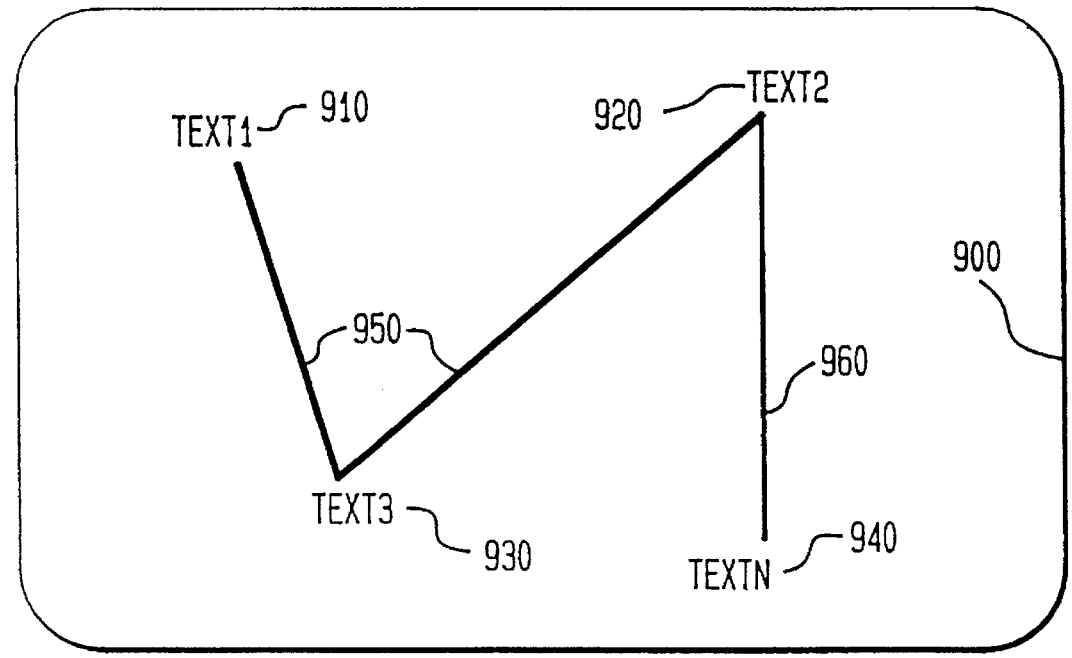
FIG. 9 shows a display with nodes and lines representing the current call stack connecting some of the nodes.

Refer to FIG. 9. The four nodes 910, 920, 930, 940 (FIG. 9) are rendered on a graphical display 900 (FIG. 9) with text Text1, Text2, Text3, Textn, respectively. The nodes represent classes that are on the current call stack of the object-oriented program. The nodes 910, 920, 930, 940 represent classes, and the text identifies a class. More nodes that are not on the current call stack may appear on the display; they are not shown in this figure. The line segments 950, 960 (FIG. 9) connect all nodes on the current call stack in the order of the message sends. The last line segment 960 (FIG. 9) represents the last message send on the call stack, and it is rendered differently than the other line segments.

Figure 10:
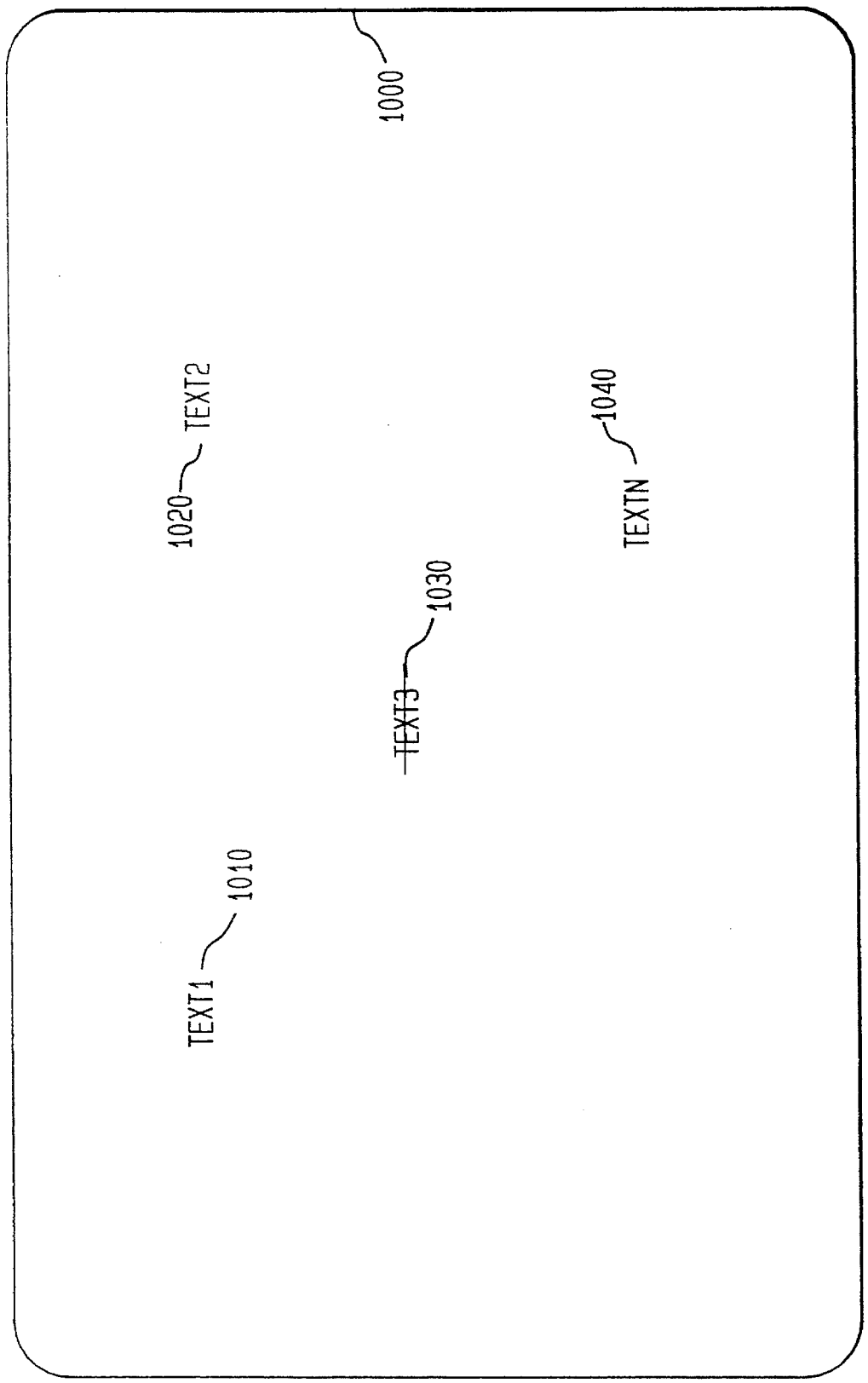
FIG. 10 shows a display with nodes, one of which is being removed from the display.

Refer to FIG. 10. A graphical interface display 1000 (FIG. 10) is shown with nodes 1010, 1020, 1030, 1040 (FIG. 10) that represent classes of an object-oriented program. Each node is rendered as text Text1, Text2, Text3, Textn that identifies the associated class. The node represented by 1030 (Text3 with a strikeout line through the text) represents a node that is being removed from the display 1000 (FIG. 10). As an option, we can make nodes 1030 (FIG. 10) disappear from the display 1000 (FIG. 10). The node 1030 (FIG. 10) of a given class will disappear if no instances of this class remain in the Object-Oriented Program 300 (FIG. 3).

All of the previous techniques can be applied to a display where the nodes represent objects instead of classes in the Object-Oriented Program 300 (FIG. 3). In that case, the display will show an animated interaction between the objects of the Object-Oriented Program 300 (FIG. 3). An object will appear on the display as a floating node when it is first created and will disappear when it is destroyed. The interactions between the objects can be defined in similar ways as the above-mentioned interactions between classes (communication, creation, aggregation).

Given this disclosure, one skilled in the art could come up with alternative equivalent embodiments that are within the contemplation of the inventors.

We claim:

1. A computer with a graphical interface comprising:
   a. one or more nodes displayed on the graphical interface, each node representing a class of an object-oriented program that has been active during execution, and each node having a placement on the graphical interface;
   b. an event collector executed by the computer with the object-oriented program, the event collector collecting one or more events produced by the executing object-oriented program, the events being data structures that have execution information about the execution of the object-oriented program; and
   c. a visualizer that receives the execution information from the event collector, the visualizer moving one or more of the nodes on the graphical interface to a new placement of the node, the new placement of the node being determined by a degree of interaction, determined from the execution information, between the class that the node represents and all other classes.

2. A computer, as in claim 1, where a distance between a first node and a second node changes as defined by the degree of interaction between any two of the classes respectively corresponding to the first and second node where the two classes are interacting classes, and the distance between the first and second node is proportional to the degree of interaction.

3. A computer, as in claim 2, where the degree of interaction reflects communication between the interacting classes and is defined as the number of messages between the two interacting classes.

4. A computer, as in claim 2, where the degree of interaction between the two interacting classes reflects creation and is defined as the number of times one of the interacting classes creates an object of the other interacting class.

5. A computer, as in claim 2, where the degree of interaction between the two interacting classes reflects aggregation and is defined as the total number of objects of one of the interacting classes that were created during the creation of an object of the other interacting class.

6. A computer, as in claim 2, where the nodes are representing the objects of an object-oriented program.

7. A computer, as in claim 6, where the degree of interaction between two objects reflects communication and is defined as the number of messages between these objects.

8. A computer, as in claim 6, where the degree of interaction between two objects reflects creation and is defined as 1 if one of these objects creates the other and defined as 0 otherwise.

9. A computer, as in claim 6, where the degree of interaction between two objects reflects aggregation between those objects and is defined as 1 if one of those objects was created during the creation of the other object and defined as 0 otherwise.

10. A computer, as in claim 1, where a node for a class appears on the graphical interface when the first or only object of the class is created.

11. A computer, as in claim 1, where the interaction is represented by a line between the nodes respectfully corresponding to each of the two interacting classes.

12. A computer, as in claim 11, where the lines change in appearance to represent the degree of interaction.

13. A computer, as in claim 12, where the change in appearance is a change in color.

14. A computer, as in claim 12, where the change in appearance is a change in line thickness.

15. A computer, as in claim 1, where a call stack is dynamically shown by lines between the nodes of classes in a sequence that the methods of the classes are found on the call stack, the lines between the nodes appearing and disappearing as one or more respective methods of the classes enter and exit the call stack.

16. A computer, as in claim 1, where a node is removed from the graphical interface when objects no longer exist for the class, and all the degrees of interaction between the classes of the removed node and other classes are set to zero, causing a redetermination of the positions of the remaining nodes.

17. A computer, as in claim 16, where the node is an object and the node is removed when the object is destroyed.

18. A computer, as in claim 1, where the nodes change in appearance to represent the current level of interaction for this node.

19. A computer, as in claim 18, where the change in appearance is the change in color.

20. A computer, as in claim 18, where the change in appearance is the change in size.

21. A computer, as in claim 1, where the nodes are representing the objects of an object-oriented program.

* * * * *